US011917719B2

United States Patent
Hua et al.

(10) Patent No.: US 11,917,719 B2
(45) Date of Patent: Feb. 27, 2024

(54) SYSTEMS AND METHODS FOR PREDICTIVE LOCATION DETERMINATION OF A USER EQUIPMENT IN A WIRELESS NETWORK

(71) Applicant: Verizon Patent and Licensing Inc., Basking Ridge, NJ (US)

(72) Inventors: Suzann Hua, Beverly Hills, CA (US); Sudhakar Reddy Patil, Westlake, TX (US); Parry Cornell Booker, Arlington, TX (US); Ye Huang, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 115 days.

(21) Appl. No.: 17/492,813

(22) Filed: Oct. 4, 2021

(65) Prior Publication Data
US 2023/0106566 A1 Apr. 6, 2023

(51) Int. Cl.
*H04W 60/00* (2009.01)
*H04W 8/02* (2009.01)
*H04W 60/04* (2009.01)

(52) U.S. Cl.
CPC .......... *H04W 8/02* (2013.01); *H04W 60/005* (2013.01); *H04W 60/04* (2013.01)

(58) Field of Classification Search
CPC ..... H04W 8/02; H04W 60/04; H04W 60/005; H04W 60/00
See application file for complete search history.

(56) References Cited

U.S. PATENT DOCUMENTS

| | | | | |
|---|---|---|---|---|
| 9,497,614 | B1* | 11/2016 | Ridel | H04W 36/14 |
| 11,140,738 | B1* | 10/2021 | Rane | H04W 76/19 |
| 2016/0171395 | A1* | 6/2016 | Lippow | G06Q 10/025 |
| | | | | 705/6 |
| 2022/0191685 | A1* | 6/2022 | Hu | H04W 8/20 |

OTHER PUBLICATIONS

APIS Training, "Why is there no Tracking Area Update procedure in 5G?" (available at https://apistraining.com/tracking-area-5g/, visited Sep. 20, 2021).
3GPP TS 23.501 V17.2.0 (Sep. 2021), "3rd Generation Partnership Project; Technical Specification Group Services and System Aspects; System architecture for the 5G System (5GS); Stage 2 (Release 17)," Sep. 2021.

* cited by examiner

*Primary Examiner* — Jinsong Hu
*Assistant Examiner* — Farideh Madani

(57) ABSTRACT

A system described herein may provide a technique for the predictive determination of regions, such as registration areas associated with a wireless network, with respect to a User Equipment ("UE") that registers with the wireless network. Such registration areas may be associated with different services, Quality of Service ("QoS") parameters, network slices, or the like. When registering with the wireless network, the UE may receive an indication of a registration area that includes multiple tracking areas, which include a tracking area in which the UE is currently located and one or more other tracking areas in which the UE is likely to enter, as predicted based on one or more artificial intelligence/machine learning ("AI/ML") models. The prediction may be based on the current location of the UE, UE attributes or parameters, and/or historical location information associated with the UE and/or other UEs.

12 Claims, 9 Drawing Sheets

SYSTEMS AND METHODS FOR PREDICTIVE LOCATION DETERMINATION OF A USER EQUIPMENT IN A WIRELESS NETWORK

BACKGROUND

Wireless networks may include mobility management functions that communicate with User Equipment ("UEs"), such as mobile telephones and other functions of the wireless network in order to facilitate the establishment of communication sessions between the UEs and the wireless network. For example, a UE and a mobility management function may perform a registration procedure, in which services or parameters may be identified for the UE based on a location of the UE.

DETAILED DESCRIPTION OF EXAMPLE EMBODIMENTS

The following detailed description refers to the accompanying drawings. The same reference numbers in different drawings may identify the same or similar elements.

Embodiments described herein provide for the predictive determination of registration areas, or sets of registration areas, associated with a wireless network with respect to a UE that registers with the wireless network. Such registration areas may be associated with different services, Quality of Service ("QoS") parameters, network slices, or the like. When registering with the wireless network, the UE may receive an indication of multiple registration areas, which include a registration area in which the UE is currently located and one or more other registration areas in which the UE is likely to enter (e.g., as predicted in accordance with some embodiments described below). Some embodiments may, for example, utilize artificial intelligence/machine learning ("AI/ML") techniques or other suitable techniques to predict registration areas for a given UE based on the current location of the UE, UE attributes or parameters, and/or historical location information associated with the UE and/or other UEs. As such, the registration areas that the UE is likely to enter may be predicted with a relatively high degree of accuracy. Predicting such registration areas, in accordance with some embodiments, may reduce the amount of control signaling (e.g., registration procedures) between the UE and the wireless network when the UE moves from one registration area to another.

Further, as described herein, some embodiments provide for enhanced or modified interfaces between particular network elements of a core of the wireless network in order to facilitate such operations. Additionally, some embodiments provide an enhanced or modified application programming interface ("API") or other type of interface, via which a device or system (e.g., an application server, a content provider, etc.) that is external to the core of the wireless network may request or receive predicted location information for the UE, which may allow such device or system to proactively provide and/or determine location-based services for the UE.

Figure 1A:
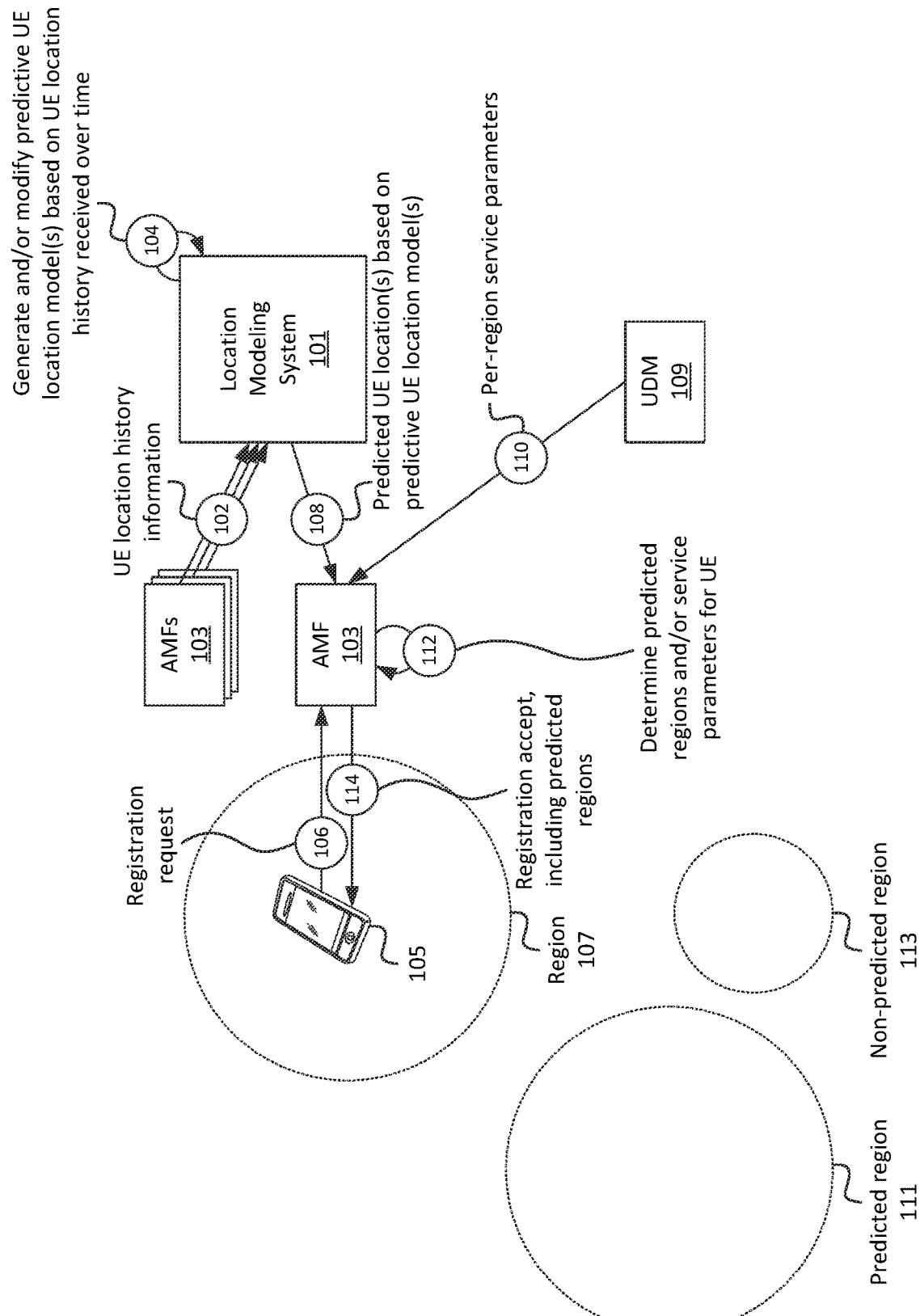
FIGS. 1A-1C illustrate an example overview of one or more embodiments described herein.

As shown in FIG. 1A, Location Modeling System ("LMS") 101 may receive (at 102) UE location history information from a set of Access and Mobility Management Functions ("AMFs") 103. Such AMFs may be included in or otherwise associated with a core of a wireless network. In some embodiments, LMS 101 may receive UE location history information from one or more other types of devices or systems, such as a Mobility Management Entity ("MME"), a UE information repository, directly from one or more UEs (e.g., via an API or other suitable communication pathway), and/or some other information source. In some embodiments, a given AMF 103 may provide UE location history information to LMS 101 when a UE, which has registered with AMF 103, deregisters from AMF 103 (e.g., powers off, registers with a different AMF 103, etc.). In some embodiments, AMF 103 may provide UE location history information to LMS 101 on some other basis, such as a periodic basis, an ongoing basis, etc. In some embodiments, as discussed below, AMF 103 may provide (at 102) the UE location history information indirectly to LMS 101, such as by providing such information to one or more other devices or systems that forward the UE location history information to LMS 101. In some embodiments, the UE location history information may indicate one or more geographical regions, registration areas, tracking areas, or the like in which a particular UE has been located while registered with AMF 103.

Based on the received UE location history information, LMS 101 may generate and/or modify (at 104) one or more predictive UE location models. For example, LMS 101 may utilize one or more AI/ML techniques such as supervised and/or unsupervised machine learning, K-means clustering, neural networks, deep learning, user-provided feedback, classification, and/or other suitable techniques to determine the predictive UE location models. The predictive UE location models may, for example, associate or correlate sets of input parameters with sets of output parameters. Respective sets of input parameters may be associated with respective sets of output parameters with a measure of likelihood, affinity, cost, confidence, and/or some other measure of correlation.

For example, the predictive UE location models may associate attributes, parameters, etc. of UEs with a predicted set of locations. As discussed below, UEs that match (e.g., with at least a threshold measure of similarity) such attributes, parameters, etc. may be identified as being likely (e.g., with at least a threshold measure of likelihood) to be located within the predicted set of locations. The attributes, parameters, etc. of such UEs may include a location history of the UEs, make and/or model of the UEs, attributes of users of the UEs (e.g., groups, categories, tags, etc. with which such users are associated and/or other classifications associated with such users), types of services used by the UEs (e.g., voice calls, data services, etc.), usage patterns associated with the UEs (e.g., types and/or amounts of traffic associated with the UEs), network slices associated with the UEs, temporal parameters (e.g., time of day, day of the week, season, etc.), locale features (e.g., weather, topography, particulate matter or other measure of air quality), radio frequency ("RF") metrics (e.g., Signal-to-Interference-and-Noise-Ratio ("SINR"), Received Signal Strength Indicator ("RSSI"), etc.), and/or other attributes, parameters etc. of the UEs.

In some embodiments, the attributes, parameters, etc. may include predicted locations provided to the UEs as part of a registration procedure, as discussed in further detail below. For example, as part of the generation and/or refinement of one or more UE location models, LMS 101 may compare UE location information for a given UE to a set of predicted locations that were provided to the UE and/or otherwise determined for the UE during the registration procedure. If, for instance, a given UE visited some or all locations of the set of predicted locations, LMS 101 may increase, strengthen, etc. a measure of correlation, affinity, etc. between attributes of the UE and the set of predicted locations. If, on the other hand, a given UE did not visit some or all of the locations of the set of predicted locations, LMS 101 may reduce, weaken, etc. a measure of correlation, affinity, etc., between attributes of the UE and one or more of the set of predicted locations (e.g., locations that the UE did not visit).

As further shown in FIG. 1, a particular UE 105 may output (at 106) a registration request to a particular AMF 103. In this example, UE 105 is located in a particular region 107, which may include a registration area, a tracking area, and/or some other suitable type of region. In some embodiments, each region may be associated with a particular set of service parameters, which may include network slices that UEs within particular regions may access, traffic policies for traffic to and/or from UEs located within particular regions, services and/or applications for which UEs located within particular regions are authorized, and/or other suitable parameters. In some embodiments a given AMF 103 may be associated with a particular region, and/or may be associated with multiple regions.

The registration request may be provided (at 106) based on UE 105 entering region 107 from another region, based on UE 105 being powered on while located within region 107, and/or as part of some other procedure. The registration request may include an identifier of UE 105, such as a Subscription Permanent Identifier ("SUPI"), a Globally Unique Temporary Identifier ("GUTI"), an International Mobile Subscriber Identity ("IMSI"), an International Mobile Station Equipment Identity ("IMEI"), an Internet Protocol ("IP") address, and/or some other suitable identifier. In some embodiments, the registration request may include an identifier of the particular region 107 in which UE 105 is located, and/or may otherwise include information from which the location of UE 105 may be identified. In some embodiments, the location of UE 105 (e.g., an indication of region 107) may be received from some other suitable device or system that determine or track the location of UE 105.

AMF 103 may also receive (at 108) a set of predicted UE locations based on one or more predictive UE location models generated and/or modified by LMS 101. In some embodiments, LMS 101 may provide (at 108) some or all of the predictive UE location models to AMF 103, based on which AMF 103 may subsequently identify a set of predicted regions associated with UE 105. Additionally, or alternatively, AMF 103 may provide attributes and/or identifying information regarding UE 105 to LMS 101, which may identify a set of predicted regions associated with UE 105. In some embodiments, one or more other devices or systems, in addition to or in lieu of AMF 103 and/or LMS 101, may receive and/or maintain such models and identify a set of predicted regions associated with UE 105 based on the models and based on attributes of UE 105.

In this example, assume that AMF 103 receives (at 108) and maintains one or more of the predictive UE location models generated and/or modified (at 104) by LMS 101. AMF 103 may further receive (at 110) a set of per-region service parameters from one or more devices or systems that maintain such information, such as Unified Data Management function ("UDM") 109. For example, as similarly discussed above, the per-region service parameters may include an indication of particular policies, services, slices, etc. associated with particular regions, which may include regions 107, 111, 113, and/or other regions associated with the wireless network.

AMF 103 may determine (at 112) a set of predicted regions associated with UE 105 based on the request (at 106). For example, AMF 103 may compare attributes, parameters, etc. associated with UE 105 to UE attributes, parameters, etc. indicated in the one or more predictive UE location models. AMF 103 may perform a suitable similarity analysis based on the comparing, in order to identify a particular set (or sets) of UE attributes, parameters, etc. indicated in the one or more predictive UE location models that match (e.g., with at least a threshold measure of similarity) the attributes, parameters, etc. of UE 105. AMF 103 may further identify a set of predicted regions for UE 105 based on identifying the particular set (or sets) of UE attributes, parameters, etc. of the one or more predictive UE location models. For example, LMS 101 may determine that the one or more predictive UE location models indicate that region 111 is a "predicted" region for UE 105, while region 113 is a "non-predicted" region. That is, in some embodiments, AMF 103 may determine that a likelihood that UE 105, which is currently located in region 107, will move to region 111 (e.g., directly from region 107 and/or indirectly via one or more other regions) exceeds a threshold likelihood. On the other hand, AMF may determine that a likelihood that UE 105 will move to region 113 (e.g., directly from region 107 and/or indirectly via one or more other regions) does not exceed the threshold likelihood.

AMF 103 may further identify service parameters associated with current region 107 and predicted region 111, and may complete the registration process with UE 105 based on the service parameters. For example, AMF 103 may establish a UE context based on the service parameters, may indicate the service parameters to one or more elements of a wireless network core (e.g., a Session Management Function ("SMF") and/or one or more other network elements), and/or perform other suitable functions based on the identified service parameters. While described as being performed by AMF 103, in some embodiments, one or more other devices or systems (e.g., UDM 109, LMS 101, and/or some other device or system) may determine (at 112) predicted regions for UE 105, and may indicate such predicted regions to AMF 103.

AMF 103 may output (at 114) a response to the registration, such as a Registration Accept message. The response may include an indication of the predicted regions determined for UE 105 and/or the current region of UE 105 (e.g., regions 107 and 111, in this example). The response may omit regions that are not in the set of predicted regions (e.g., determined at 112), such as non-predicted region 113, in this example.

Figure 1B:
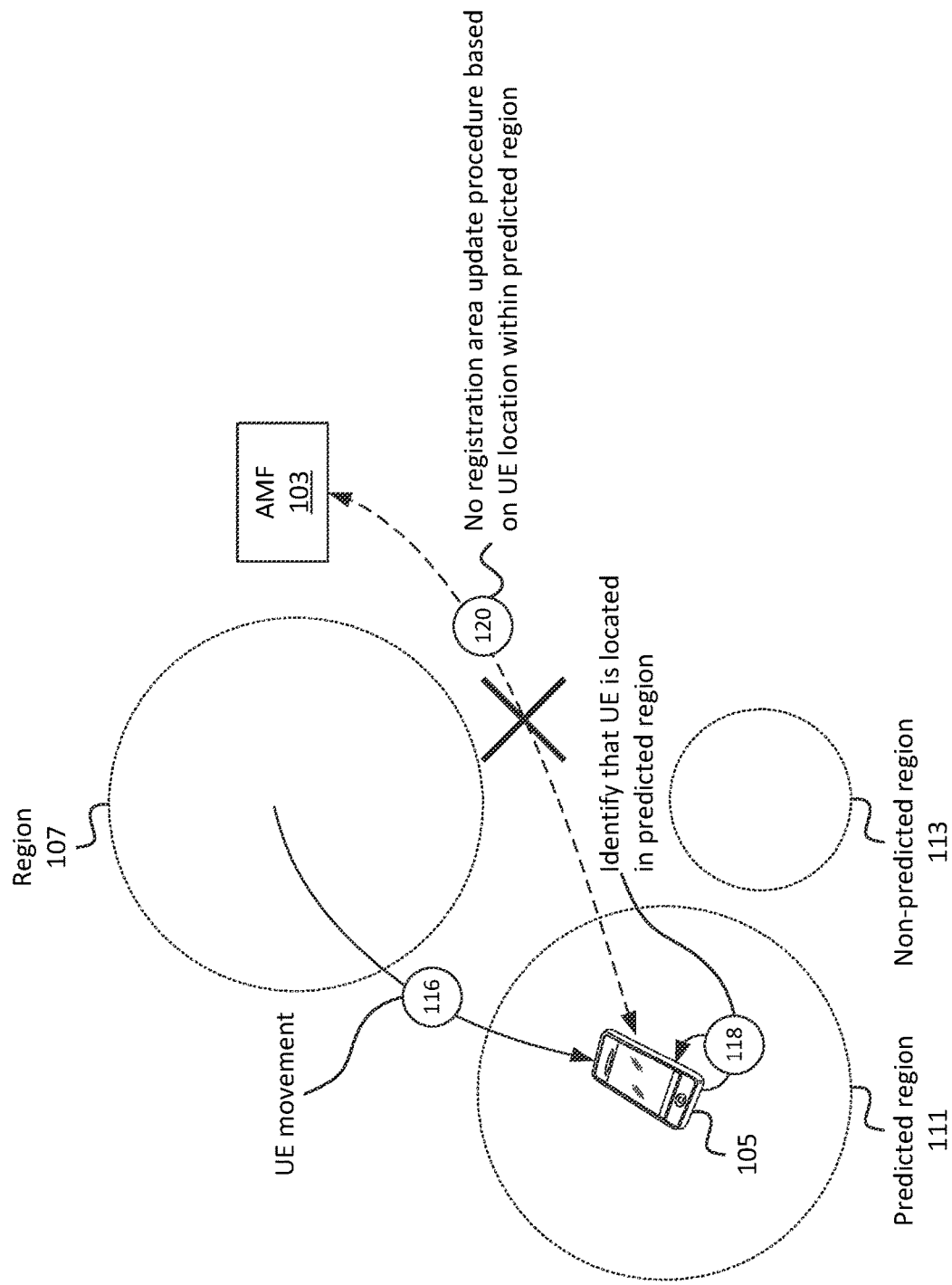

By establishing and/or maintaining context information for UE 105 based on service parameters associated with predicted regions, AMF 103 and UE 105 may not need to perform the registration procedure again when UE 105 moves to a predicted region (e.g., predicted region 111). For example, as shown in FIG. 1B, UE 105 may move (at 116) from region 107 to predicted region 111. Based on the response (e.g., at 114) that includes predicted region 111, UE 105 may determine (at 118) that UE 105 is located within a region that is within a set of predicted regions for UE 105. As such, UE 105 may forgo outputting (at 120) an update message, such as a Registration Request message, to AMF 103, indicating that UE 105 has moved to a different region. As such, the amount of control signaling that would be caused by UEs moving across regions may be reduced. Further, as the particular predicted regions for a given UE and/or registration request may be determined based on models that are generated and/or refined using AI/ML techniques or other suitable techniques, the selection of predicted regions for the given UE may minimize or eliminate the errant identification of predicted regions for the UE. That is, identifying "false positives" of predicted regions may consume additional resources associated of AMF 103 and/or other network elements (e.g., to maintain context information for the UE and multiple regions), and accurately predicting regions for UEs based on attributes of such UEs as well as based on historical UE information may reduce or eliminate such additional resource consumption.

Figure 1C:
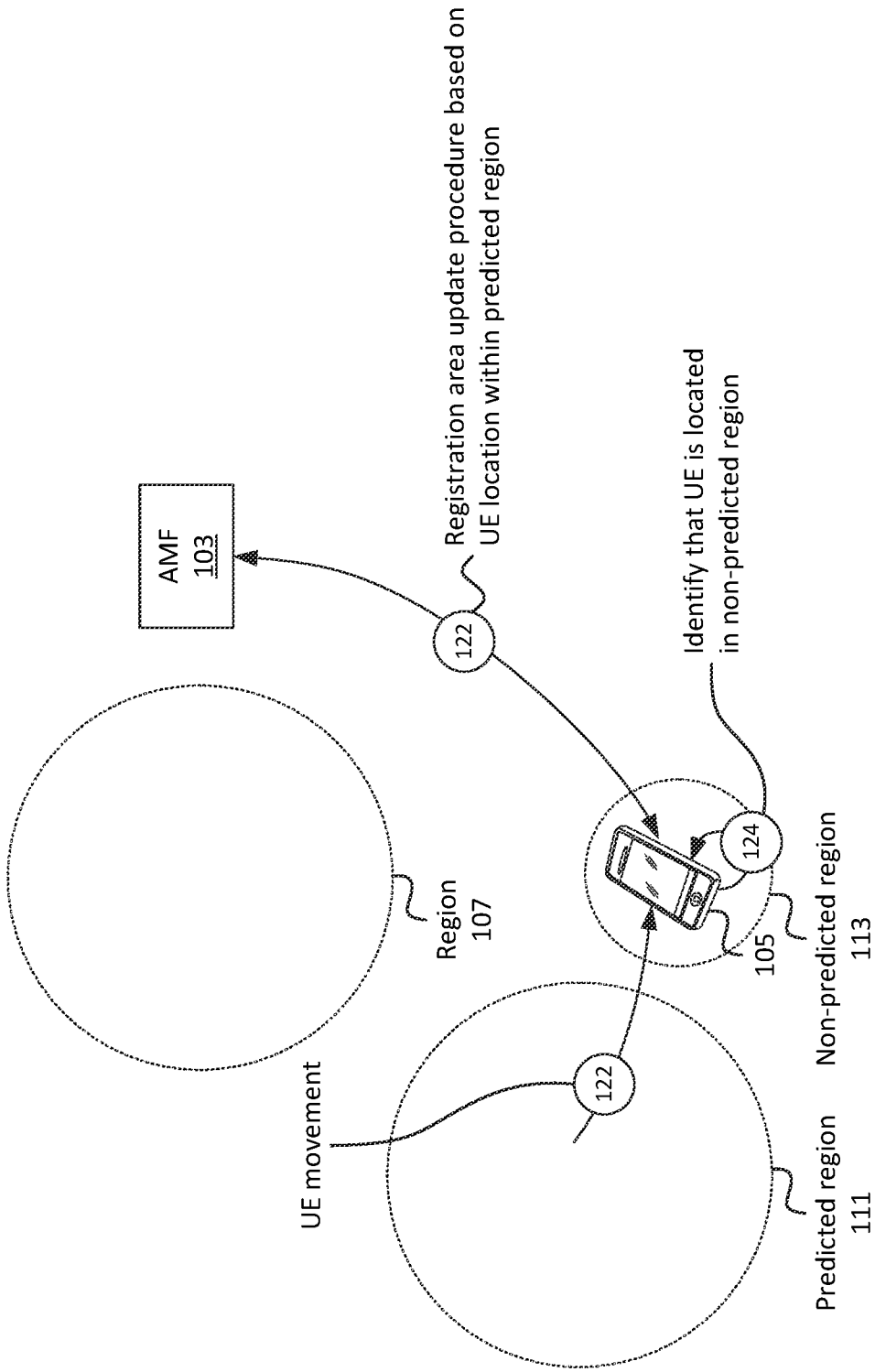

FIG. 1C illustrates an example of UE 105 moving (at 122) to non-predicted region 113. UE 105 may determine (at 124) that region 113 was not indicated by AMF 103 as being associated with UE 105 (e.g., was not indicated in the response message at 114). As such, UE 105 may initiate (at 122) an update procedure, such as a Registration Area Update procedure, with AMF 103 to register UE 105 with region 113. Based on such procedure, AMF 103 may modify an existing UE context and/or create UE context information for UE 105 based on the movement to region 113. As discussed below, LMS 101 may further receive information (e.g., from AMF 103 and/or some other device or system) indicating UE location history information, including the movement of UE 105 to non-predicted region 113. In some embodiments, LMS 101 may modify one or more predictive UE location models based on the movement of UE 105 to non-predicted region 113, such as by strengthening, increasing, etc. a measure of correlation, affinity, etc. to attributes of UE 105. As discussed above, such attributes may include historical location information of UE 105 (e.g., the presence of UE 105 in region 107, then in region 111, and then in region 113). In some embodiments, the attributes may include an indication that UE 105 was in region 107 when receiving a set of predicted regions that did not include region 113. In this manner, LMS 101 may continue to refine, train, etc. predictive UE location models in order to improve the predictive accuracy of such models in subsequent iterations.

Figure 2:
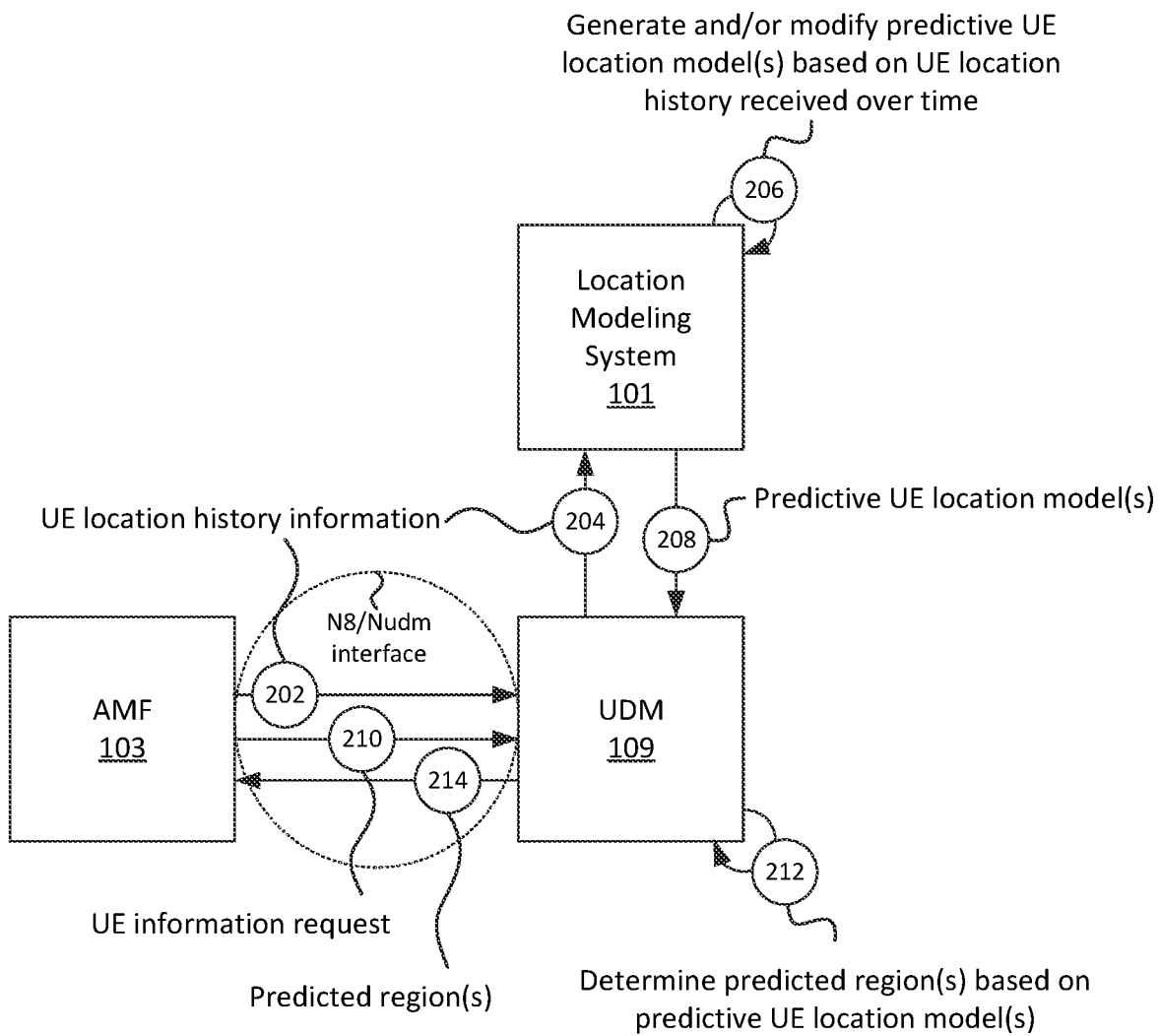
FIG. 2 illustrates example signaling that may be performed to generate, modify, and/or utilize predictive UE location models to associate a UE with a particular set of regions associated with a wireless network, in accordance with some embodiments.

FIG. 2 illustrates example signaling that may be performed to generate, modify, and/or utilize predictive UE location models, in accordance with some embodiments. For example, as shown, one or more AMFs (including the particular AMF 103 shown in FIG. 2 and/or other AMFs) may provide (at 202) UE location history information to UDM 109 via an N8 interface, an Nudm interface, and/or some other suitable interface. In some embodiments, AMF 103 may provide such information, associated with a particular UE 105, when UE 105 has deregistered from AMF 103 and/or at some other suitable time. In some embodiments, AMF 103 may also include (at 202) an indication of a set of predicted regions that were provided to UE 105 when UE 105 registered with AMF 103.

UDM 109 may provide (at 204) the UE location history information to LMS 101. In some embodiments, LMS 101 and UDM 109 may communicate via an API or other suitable communication interface. In some embodiments, UDM 109 may perform one or more of the functions described with respect to LMS 101 (e.g., UDM 109 and LMS 101 may be co-located and/or some or all of the functionality of UDM 109, LMS 101, and/or one or more other network elements such as a Unified Data Repository ("UDR") may be performed by the same device or system). In this example, LMS 101 and UDM 109 are described as separate systems.

As discussed above, LMS 101 may generate and/or modify (at 206) predictive UE location models based on UE location history information received over time, such as the information provided by AMF 103 and/or other devices or systems. As also discussed above, such predictive UE location models may be based on whether UEs visited or did not visit regions that were provided to such UEs as predicted regions during a registration process.

LMS 101 may maintain such predictive UE location models, and/or may provide (at 208) such models to UDM 109. At some later time, AMF 103 may further output (at 210) an information request associated with a particular UE. For example, AMF 103 may output the information request as part of a registration procedure with the particular UE. The information request may be or may include a Subscriber Data Management Request, a UE Context Management Request, and/or some other suitable type of request. The information request may include an identifier of the UE (e.g., based on which UDM 109 may identify attributes associated with the UE), and/or may include attributes of the UE.

UDM 109 may determine (at 212) a set of predicted regions for the particular UE based on the predictive UE location models and the attributes of the particular UE. For example, UDM 109 may identify a set of regions that are associated with a set of attributes that match (e.g., with at least a threshold measure of similarity) attributes of the particular UE. UDM 109 may provide (at 214) a response to the information request. In some embodiments, the response may include a Subscriber Data Management Response, a UE Context Management Response, and/or some other suitable type of response. The response may, in accordance with some embodiments, indicate the set of predicted regions that were determined (at 212) based on the UE attributes and the one or more predictive UE location models. In some embodiments, the response may further include an indication of particular services, parameters, etc. associated with the predicted regions.

Figure 3:
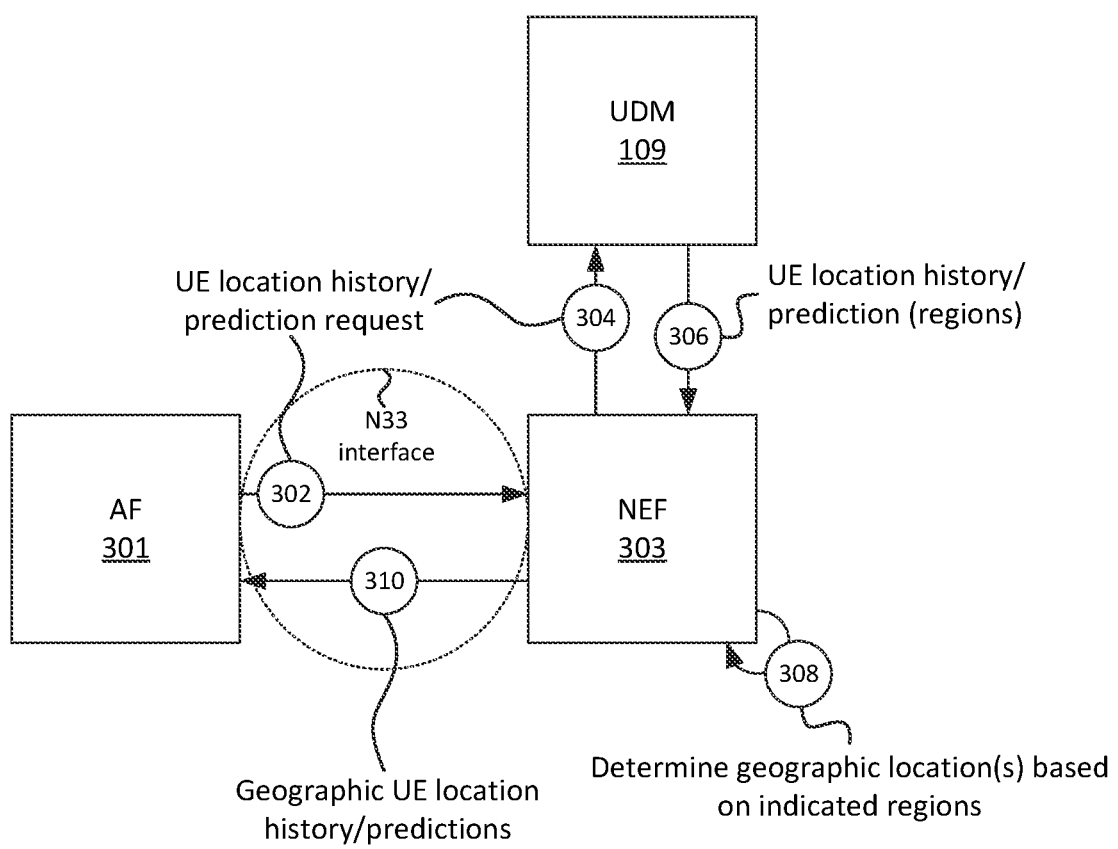
FIG. 3 illustrates the providing of location history information and/or predicted regions associated with a given UE to one or more devices or systems that are external to a wireless network core, in accordance with some embodiments.

In some embodiments, the location history information and/or predicted regions associated with a given UE may be made available to one or more devices or systems that are external to a wireless network core. For example, as shown in FIG. 3, Application Function ("AF") 301 may output (at 302) a location history and/or location prediction request for a particular UE to Network Exposure Function ("NEF") 303. NEF 303 may, for example, communicate with one or more elements of a wireless network core (e.g., UDM 109, AMF 103, etc.) via an Nnef interface and/or some other suitable communication pathway. NEF 303 may, in some embodiments, serve as an interface between such elements of the wireless network core and authorized external devices or systems to relay information, instructions, or the like between elements of the wireless network core and authorized external devices.

In some embodiments, the request may be received (at 302) via an N33 interface or some other suitable interface. The request may include an identifier of the particular UE, a user associated with the particular UE, and/or other suitable identifying information associated with the particular UE. In some embodiments, NEF 303 and/or some other device or system may authenticate the request, such as by verifying that AF 301 is authorized to request and/or receive information regarding the particular UE or user.

For example, in some embodiments, AF 301 may be associated with and/or may include an emergency or first responder system that may be used to locate a missing user of the particular UE. The predicted location information may be useful in situations where the particular UE has been turned off or is otherwise unreachable (e.g., is unable to be paged, located, etc. by AMF 103). As another example, AF 301 may be associated with a family account, and a parental user may initiate a request to locate a mobile phone or other type of UE that is used by a child, in order to locate the child.

NEF 303 may further provide (at 304) a location history and/or prediction request to UDM 109, and UDM 109 may provide (at 306) a location history of the particular UE and/or an indication of a predicted set of regions associated with the particular UE. For example, as discussed above, the predicted set of regions may have been determined based on a registration procedure associated with the particular UE, an information request (e.g., at 210) from AMF 103 to UDM 109, and/or based on some other suitable procedure. In some embodiments, UDM 109 may indicate a measure of probability or likelihood (e.g., based on comparing attributes of the UE to the one or more models) that the particular UE will be located within a particular region.

In some embodiments, the information provided (at 306) may indicate identifiers of regions associated with the wireless network in which the particular UE is predicted to be located. NEF 303 may, in some embodiments, include a mapping or other capability to identify particular geographical locations, areas, features, etc. associated with the indicated regions. For example, such geographical locations, areas, features, etc. may include latitude and longitude coordinates, Global Positioning System ("GPS") coordinates, physical addresses, landmarks, roads, intersections, parks, campgrounds, airports, etc. NEF 303 may further provide (at 310) the requested UE location history and/or predicted locations, in terms of the geographical locations, areas, features, etc. determined (at 308) by NEF 303. In this manner, the requested information may be provided in a format more readily accessible to AF 301, as AF 301 may not have access to information mapping regions of the wireless network to geographical locations, areas, features, etc. In some embodiments, NEF 303 may also provide (at 310) a measure of probability, likelihood, etc. that the particular UE will be located at a particular geographical region, area, etc.

Figure 4:
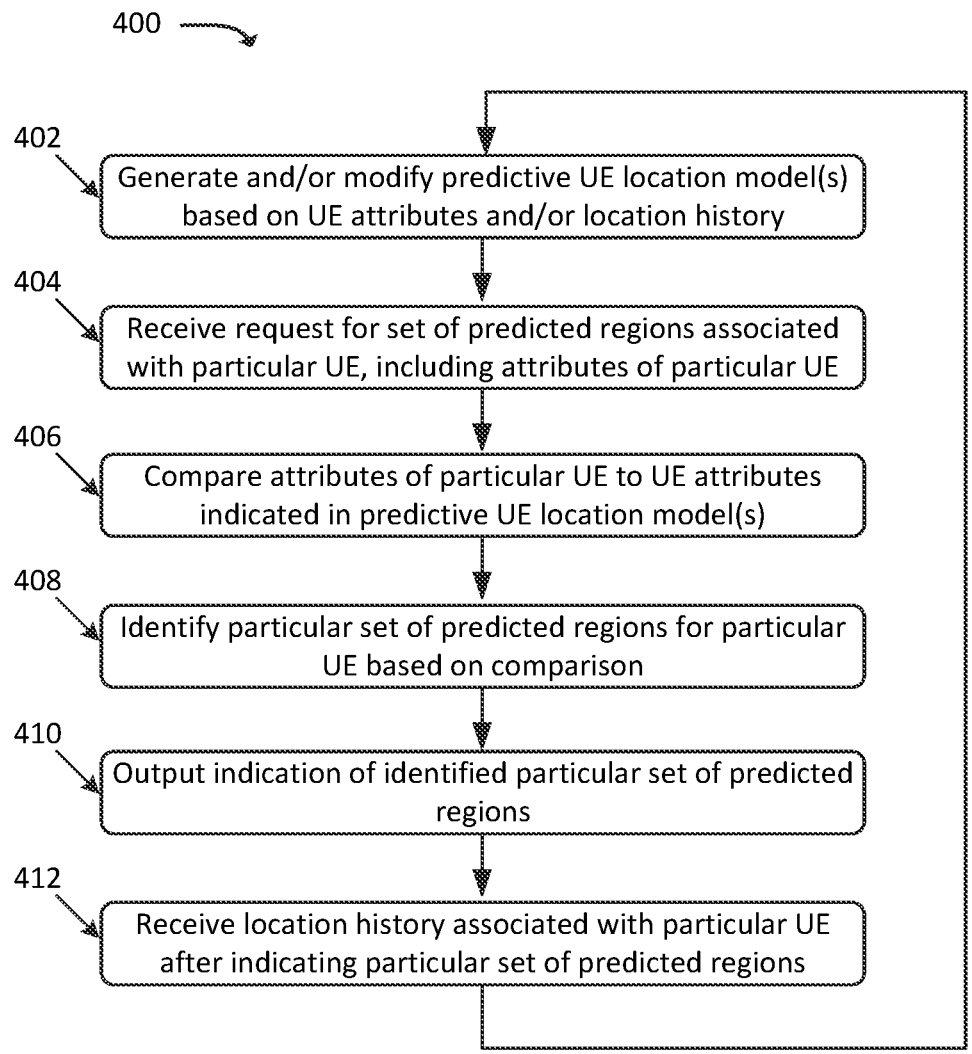
FIG. 4 illustrates an example process for generating, modifying, and/or utilizing predictive UE location models to associate a UE with a particular set of regions associated with a wireless network, in accordance with some embodiments.

FIG. 4 illustrates an example process 400 for generating, modifying, and/or utilizing predictive UE location models to associate a UE with a particular set of regions associated with a wireless network, in accordance with some embodiments. In some embodiments, some or all of process 400 may be performed by LMS 101. In some embodiments, one or more other devices may perform some or all of process 400 in concert with, and/or in lieu of, LMS 101, such as AMF 103 and/or UDM 109.

As shown, process 400 may include generating and/or modifying (at 402) one or more predictive UE location models based on attributes and/or location histories of one or more UEs. For example, as discussed above, LMS 101 may receive, over time, information regarding UEs that have registered with a wireless network (e.g., registered with one or more AMFs 103 and/or other elements of the wireless network). The attributes may include attributes of the UEs and/or users of the UEs, such as make and/or model of the UEs, UE identifiers, UE or user groups, UE or user categories, etc. The attributes may include a set of services and/or type of traffic used by such UEs when connected to the wireless network, usage patterns of the UEs, network slices with which the UEs are associated with when connected to the wireless network, etc. In some embodiments, the attributes may include attributes or measurements detected by the UEs, and/or otherwise associated with the UEs while the UEs are connected to the wireless network. Such attributes or measurements may include locale features (e.g., weather, topography, particulate matter or other measure of air quality), RF metrics, or other attributes or measurements. In some embodiments, the UE attributes may include or may be associated with an indication of a set of regions provided to the UEs when the UEs registered with the wireless network. For example, as noted above, the wireless network may be associated with a set of regions, registration areas, tracking areas, etc. which may be associated with different sets of service parameters on a per-region (or per-registration area, per-tracking area, etc.) basis.

Process 400 may further include receiving (at 404) a request for a set of predicted regions associated with a particular UE. For example, LMS 101 may receive such a request from AMF 103 based on a registration procedure between AMF 103 and a particular UE 105. Additionally, or alternatively, LMS 101 may receive such a request from AF 301 (e.g., via NEF 303). As noted above, LMS 101 may, in some embodiments, receive such a request from or via UDM 109, and/or UDM 109 may implement or maybe otherwise communicatively coupled to LMS 101.

Process 400 may additionally include comparing (at 406) attributes of the particular UE to UE attributes indicated in the predictive UE location models. For example, LMS 101 may perform a suitable similarity analysis to identify a set of UE attributes, included in the predictive UE models, that matches (e.g., identically matches, and/or matches with at least a threshold measure of similarity, correlation, etc.) the attributes of UE 105.

Process 400 may also include identifying (at 408) a particular set of predicted regions for the particular UE based on the comparison. For example, as noted above, the predictive UE models may associate respective sets of UE attributes to respective sets of regions associated with the wireless network. LMS 101 may identify the particular set of regions associated with the set of UE attributes that have been identified as matching or otherwise being associated with the attributes of UE 105.

Process 400 may further include outputting (at 410) an indication of the identified particular set of predicted regions. For example, LMS 101 may respond to the request (at 404) by indicating the regions that were identified (at 408) as being associated with the attributes of UE 105.

Process 400 may additionally include receiving (at 412) a location history associated with the particular UE after indicating the particular set of predicted regions. Process 400 may further iteratively repeat some or all of the operations described above, such as the modifying (at 402) of one or more predictive UE location models based on the received (at 412) location history of UE 105. For example, LMS 101 may strengthen, increase, etc. an affinity, correlation, etc. between attributes of UE 105 and a particular indicated region when the location history of UE 105 indicates that UE 105 visited the particular region. On the other hand, may weaken, decrease, etc. an affinity, correlation, etc. between attributes of UE 105 and a particular indicated region when the location history of UE 105 indicates that UE 105 did not visit the particular region, even though the particular region was indicated in the set of predicted regions. In this manner, LMS 101 may continue to refine the predictive UE location models, thus enhancing the predictive accuracy of such models.

Figure 5:
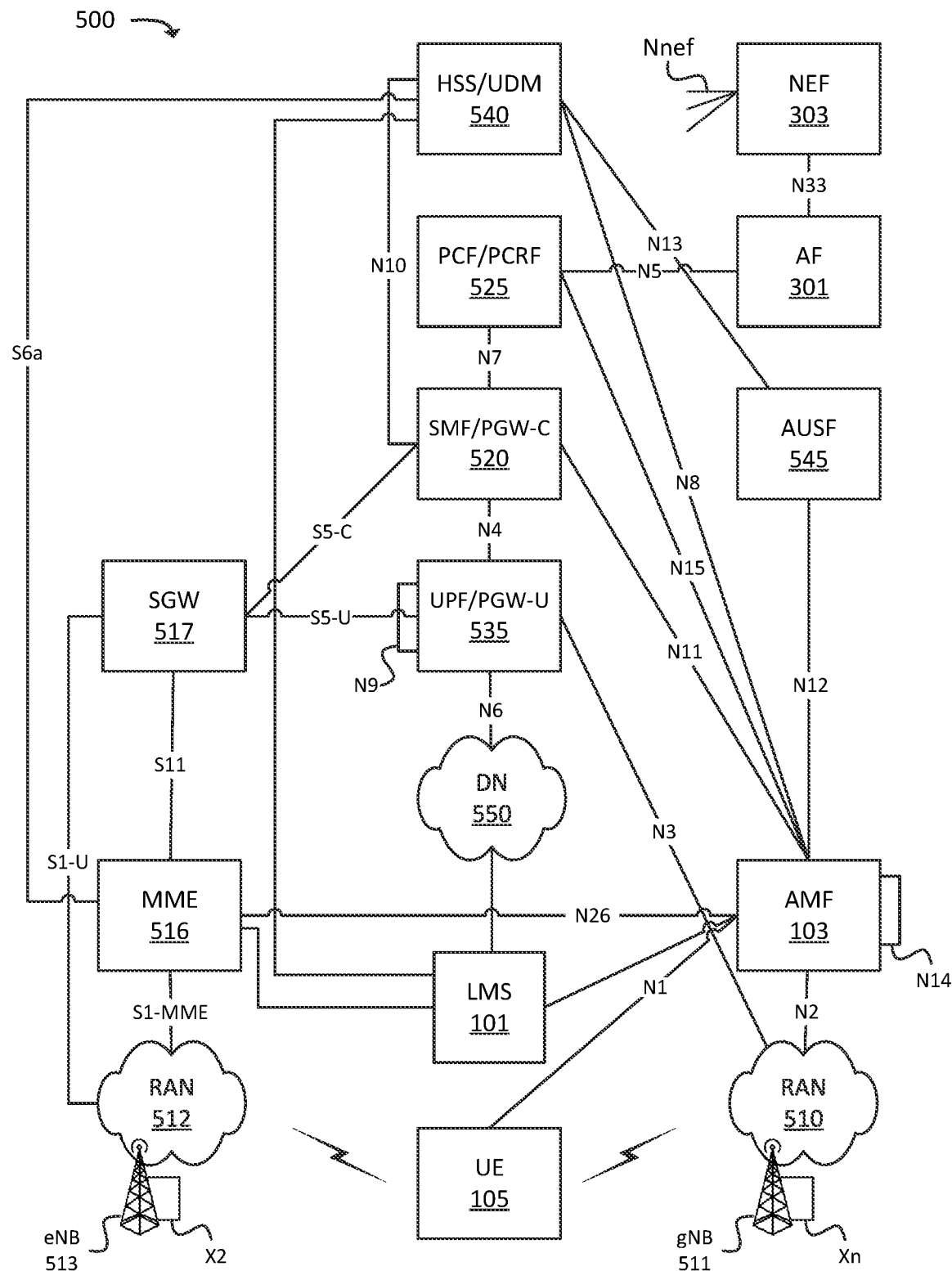
FIG. 5 illustrates an example environment in which one or more embodiments, described herein, may be implemented.

FIG. 5 illustrates an example environment 500, in which one or more embodiments may be implemented. In some embodiments, environment 500 may correspond to a Fifth Generation ("5G") network, and/or may include elements of a 5G network. In some embodiments, environment 500 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 500 may include UE 105, RAN 510 (which may include one or more Next Generation Node Bs ("gNBs") 511), RAN 512 (which may include one or more one or more evolved Node Bs ("eNBs") 513), and various network functions such as AMF 103, Mobility Management Entity ("MME") 516, Serving Gateway ("SGW") 517, Session Management Function ("SMF")/Packet Data Network ("PDN") Gateway ("PGW")-Control plane function ("PGW-C") 520, Policy Control Function ("PCF")/Policy Charging and Rules Function ("PCRF") 525, AF 301, User Plane Function ("UPF")/PGW-User plane function ("PGW-U") 535, Home Subscriber Server ("HSS")/UDM 540, Authentication Server Function ("AUSF") 545, and NEF 303. Environment 500 may also include one or more networks, such as Data Network ("DN") 550. Environment 500 may include one or more additional devices or systems communicatively coupled to one or more networks (e.g., DN 550), such as LMS 101.

The example shown in FIG. 5 illustrates one instance of each network component or function (e.g., one instance of SMF/PGW-C 520, PCF/PCRF 525, UPF/PGW-U 535, HSS/UDM 540, and/or AUSF 545). In practice, environment 500 may include multiple instances of such components or functions. For example, in some embodiments, environment 500 may include multiple "slices" of a core network, where each slice includes a discrete set of network functions (e.g., one slice may include a first instance of SMF/PGW-C 520, PCF/PCRF 525, UPF/PGW-U 535, HSS/UDM 540, and/or AUSF 545, while another slice may include a second instance of SMF/PGW-C 520, PCF/PCRF 525, UPF/PGW-U 535, HSS/UDM 540, and/or AUSF 545). The different slices may provide differentiated levels of service, such as service in accordance with different Quality of Service ("QoS") parameters.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more network functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 105 may include a computation and communication device, such as a wireless mobile communication device that is capable of communicating with RAN 510, RAN 512, and/or DN 550. UE 105 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 105 may send traffic to and/or receive traffic (e.g., user plane traffic) from DN 550 via RAN 510, RAN 512, and/or UPF/PGW-U 535.

RAN 510 may be, or may include, a 5G RAN that includes one or more base stations (e.g., one or more gNBs 511), via which UE 105 may communicate with one or more other elements of environment 500. UE 105 may communicate with RAN 510 via an air interface (e.g., as provided by gNB 511). For instance, RAN 510 may receive traffic (e.g., voice call traffic, data traffic, messaging traffic, signaling traffic, etc.) from UE 105 via the air interface, and may communicate the traffic to UPF/PGW-U 535, and/or one or more other devices or networks. Similarly, RAN 510 may receive traffic intended for UE 105 (e.g., from UPF/PGW-U 535, AMF 103, and/or one or more other devices or networks) and may communicate the traffic to UE 105 via the air interface.

RAN 512 may be, or may include, a LTE RAN that includes one or more base stations (e.g., one or more eNBs 513), via which UE 105 may communicate with one or more other elements of environment 500. UE 105 may communicate with RAN 512 via an air interface (e.g., as provided by eNB 513). For instance, RAN 510 may receive traffic (e.g., voice call traffic, data traffic, messaging traffic, signaling traffic, etc.) from UE 105 via the air interface, and may communicate the traffic to UPF/PGW-U 535, and/or one or more other devices or networks. Similarly, RAN 510 may receive traffic intended for UE 105 (e.g., from UPF/PGW-U 535, SGW 517, and/or one or more other devices or networks) and may communicate the traffic to UE 105 via the air interface.

AMF 103 may include one or more devices, systems, Virtualized Network Functions ("VNFs"), etc., that perform operations to register UE 105 with the 5G network, to establish bearer channels associated with a session with UE 105, to hand off UE 105 from the 5G network to another network, to hand off UE 105 from the other network to the 5G network, manage mobility of UE 105 between RANs 510 and/or gNBs 511, and/or to perform other operations. In some embodiments, the 5G network may include multiple AMFs 103, which communicate with each other via the N14 interface (denoted in FIG. 5 by the line marked "N14" originating and terminating at AMF 103). In some embodiments, AMF 103 may additionally perform one or more operations described above, including communicating with LMS 101 to identify predicted regions with which to register UE 105 (e.g., based on a registration request from UE 105).

MME 516 may include one or more devices, systems, VNFs, etc., that perform operations to register UE 105 with the EPC, to establish bearer channels associated with a session with UE 105, to hand off UE 105 from the EPC to another network, to hand off UE 105 from another network to the EPC, manage mobility of UE 105 between RANs 512 and/or eNBs 513, and/or to perform other operations.

SGW 517 may include one or more devices, systems, VNFs, etc., that aggregate traffic received from one or more eNBs 513 and send the aggregated traffic to an external network or device via UPF/PGW-U 535. Additionally, SGW 517 may aggregate traffic received from one or more UPF/PGW-Us 535 and may send the aggregated traffic to one or more eNBs 513. SGW 517 may operate as an anchor for the user plane during inter-eNB handovers and as an anchor for mobility between different telecommunication networks or RANs (e.g., RANs 510 and 512).

SMF/PGW-C 520 may include one or more devices, systems, VNFs, etc., that gather, process, store, and/or provide information in a manner described herein. SMF/PGW-C 520 may, for example, facilitate the establishment of communication sessions on behalf of UE 105. In some embodiments, the establishment of communications sessions may be performed in accordance with one or more policies provided by PCF/PCRF 525.

PCF/PCRF 525 may include one or more devices, systems, VNFs, etc., that aggregate information to and from the 5G network and/or other sources. PCF/PCRF 525 may receive information regarding policies and/or subscriptions from one or more sources, such as subscriber databases and/or from one or more users (such as, for example, an administrator associated with PCF/PCRF 525).

AF 301 may include one or more devices, systems, VNFs, etc., that receive, store, and/or provide information that may be used in determining parameters (e.g., quality of service parameters, charging parameters, or the like) for certain applications.

UPF/PGW-U 535 may include one or more devices, systems, VNFs, etc., that receive, store, and/or provide data (e.g., user plane data). For example, UPF/PGW-U 535 may receive user plane data (e.g., voice call traffic, data traffic, etc.), destined for UE 105, from DN 550, and may forward the user plane data toward UE 105 (e.g., via RAN 510, SMF/PGW-C 520, and/or one or more other devices). In some embodiments, multiple UPFs 535 may be deployed (e.g., in different geographical locations), and the delivery of content to UE 105 may be coordinated via the N9 interface (e.g., as denoted in FIG. 5 by the line marked "N9" originating and terminating at UPF/PGW-U 535). Similarly, UPF/PGW-U 535 may receive traffic from UE 105 (e.g., via RAN 510, SMF/PGW-C 520, and/or one or more other devices), and may forward the traffic toward DN 550. In some embodiments, UPF/PGW-U 535 may communicate (e.g., via the N4 interface) with SMF/PGW-C 520, regarding user plane data processed by UPF/PGW-U 535.

HSS/UDM 540 and AUSF 545 may include one or more devices, systems, VNFs, etc., that manage, update, and/or store, in one or more memory devices associated with AUSF 545 and/or HSS/UDM 540, profile information associated with a subscriber. AUSF 545 and/or HSS/UDM 540 may perform authentication, authorization, and/or accounting operations associated with the subscriber and/or a communication session with UE 105. In some embodiments, HSS/UDM 540 may be, may implement, may include, may be implemented by, and/or may be communicatively coupled to one or more instances of UDM 109.

DN 550 may include one or more wired and/or wireless networks. For example, DN 550 may include an IP-based PDN, a wide area network ("WAN") such as the Internet, a private enterprise network, and/or one or more other networks. UE 105 may communicate, through DN 550, with data servers, other UEs 105, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 105 may communicate.

Figure 6:
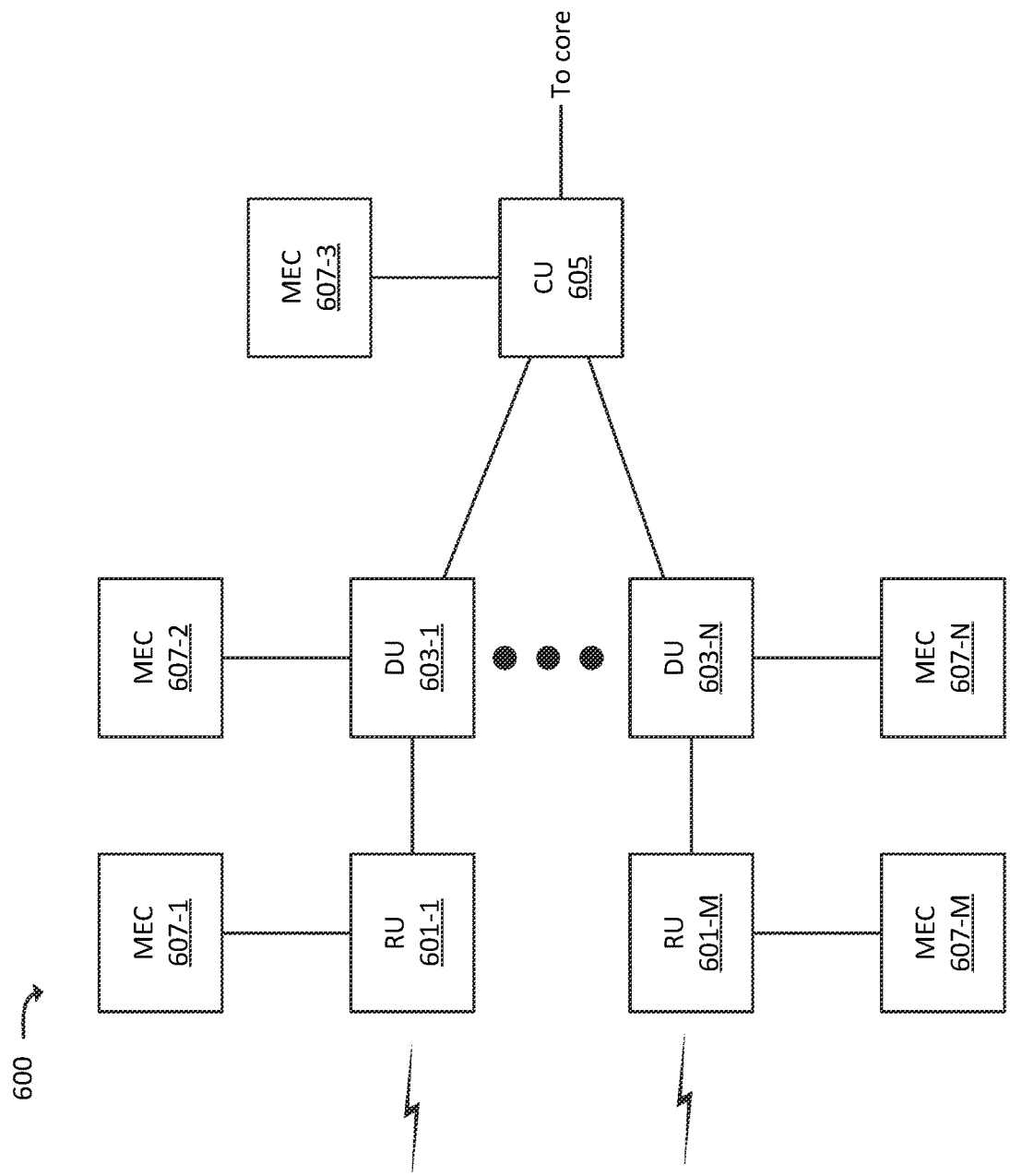
FIG. 6 illustrates an example arrangement of a radio access network ("RAN"), in accordance with some embodiments.

FIG. 6 illustrates an example Distributed Unit ("DU") network 600, which may be included in and/or implemented by one or more RANs (e.g., RAN 510, RAN 512, or some other RAN). In some embodiments, a particular RAN may include one DU network 600. In some embodiments, a particular RAN may include multiple DU networks 600. In some embodiments, DU network 600 may correspond to a particular gNB 511 of a 5G RAN (e.g., RAN 510). In some embodiments, DU network 600 may correspond to multiple gNBs 511. In some embodiments, DU network 600 may correspond to one or more other types of base stations of one or more other types of RANs. As shown, DU network 600 may include Central Unit ("CU") 605, one or more Distributed Units ("DUs") 603-1 through 603-N (referred to individually as "DU 603," or collectively as "DUs 603"), and one or more Radio Units ("RUs") 601-1 through 601-M (referred to individually as "RU 601," or collectively as "RUs 601").

CU 605 may communicate with a core of a wireless network (e.g., may communicate with one or more of the devices or systems described above with respect to FIG. 5, such as AMF 103 and/or UPF/PGW-U 535). In the uplink direction (e.g., for traffic from UEs 105 to a core network), CU 605 may aggregate traffic from DUs 603, and forward the aggregated traffic to the core network. In some embodiments, CU 605 may receive traffic according to a given protocol (e.g., Radio Link Control ("RLC")) from DUs 603, and may perform higher-layer processing (e.g., may aggregate/process RLC packets and generate Packet Data Convergence Protocol ("PDCP") packets based on the RLC packets) on the traffic received from DUs 603.

In accordance with some embodiments, CU 605 may receive downlink traffic (e.g., traffic from the core network) for a particular UE 105, and may determine which DU(s) 603 should receive the downlink traffic. DU 603 may include one or more devices that transmit traffic between a core network (e.g., via CU 605) and UE 105 (e.g., via a respective RU 601). DU 603 may, for example, receive traffic from RU 601 at a first layer (e.g., physical ("PHY") layer traffic, or lower PHY layer traffic), and may process/aggregate the traffic to a second layer (e.g., upper PHY and/or RLC). DU 603 may receive traffic from CU 605 at the second layer, may process the traffic to the first layer, and provide the processed traffic to a respective RU 601 for transmission to UE 105.

RU 601 may include hardware circuitry (e.g., one or more RF transceivers, antennas, radios, and/or other suitable hardware) to communicate wirelessly (e.g., via an RF interface) with one or more UEs 105, one or more other DUs 603 (e.g., via RUs 601 associated with DUs 603), and/or any other suitable type of device. In the uplink direction, RU 601 may receive traffic from UE 105 and/or another DU 603 via the RF interface and may provide the traffic to DU 603. In the downlink direction, RU 601 may receive traffic from DU 603, and may provide the traffic to UE 105 and/or another DU 603.

RUs 601 may, in some embodiments, be communicatively coupled to one or more Multi-Access/Mobile Edge Computing ("MEC") devices, referred to sometimes herein simply as "MECs" 607. For example, RU 601-1 may be communicatively coupled to MEC 607-1, RU 601-M may be communicatively coupled to MEC 607-M, DU 603-1 may be communicatively coupled to MEC 607-2, DU 603-N may be communicatively coupled to MEC 607-N, CU 605 may be communicatively coupled to MEC 607-3, and so on. MECs 607 may include hardware resources (e.g., configurable or provisionable hardware resources) that may be configured to provide services and/or otherwise process traffic to and/or from UE 105, via a respective RU 601.

For example, RU 601-1 may route some traffic, from UE 105, to MEC 607-1 instead of to a core network (e.g., via DU 603 and CU 605). MEC 607-1 may process the traffic, perform one or more computations based on the received traffic, and may provide traffic to UE 105 via RU 601-1. In this manner, ultra-low latency services may be provided to UE 105, as traffic does not need to traverse DU 603, CU 605, and an intervening backhaul network between DU network 600 and the core network. In some embodiments, MEC 607 may include, and/or may implement, some or all of the functionality described above with respect to LMS 101.

Figure 7:
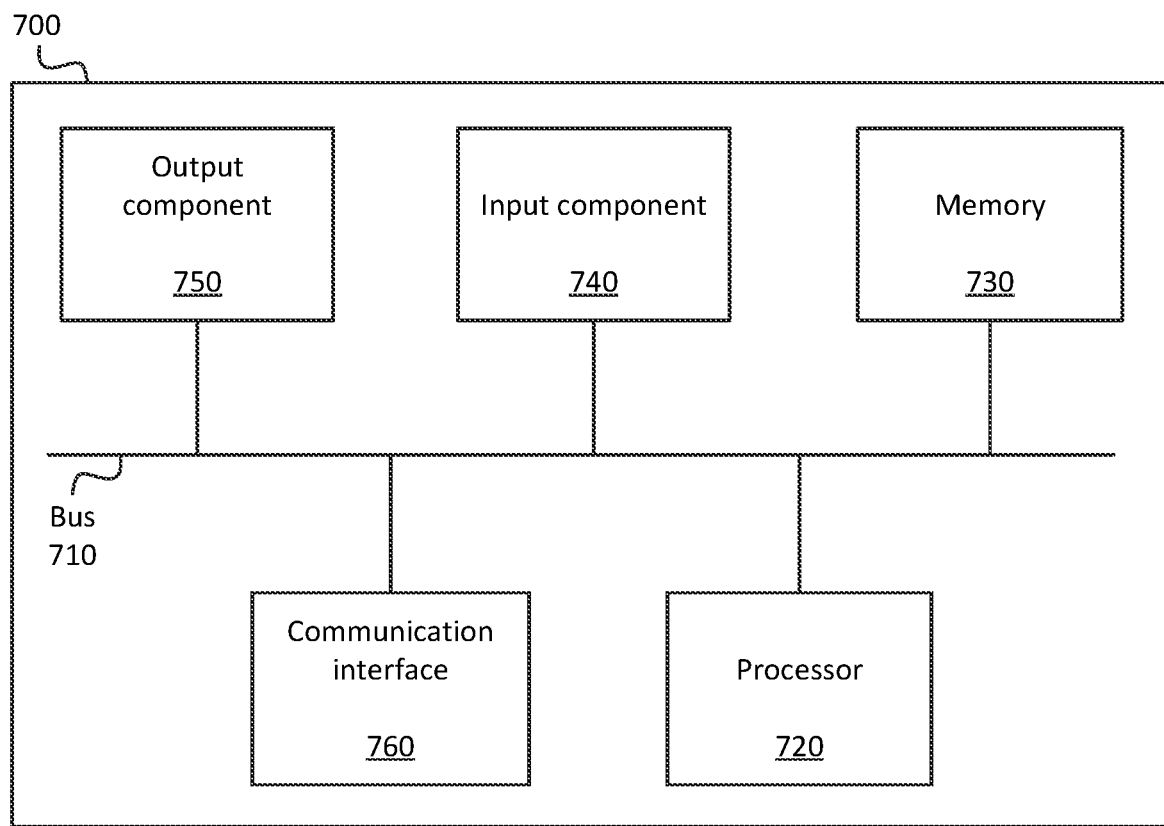
FIG. 7 illustrates example components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. In some embodiments, processor 720 may be or may include one or more hardware processors. Memory 730 may include any type of dynamic storage device that may store information and instructions for execution by processor 720, and/or any type of non-volatile storage device that may store information for use by processor 720.

Input component 740 may include a mechanism that permits an operator to input information to device 700 and/or other receives or detects input from a source external to 740, such as a touchpad, a touchscreen, a keyboard, a keypad, a button, a switch, a microphone or other audio input component, etc. In some embodiments, input component 740 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-1C and 2-4), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. One or more devices, comprising:
one or more processors configured to:
identify one or more models that correlate attributes of one or more User Equipment ("UEs") to respective sets of tracking areas associated with a wireless network;
receive, from an Access and Mobility Management Function ("AMF") of the wireless network, information indicating one or more tracking areas of the wireless network in which the one or more UEs have been located, wherein the AMF determines the one or more tracking areas based on registration procedures between the AMF and the one or more UEs;
modify the one or more models based on the received information indicating the one or more tracking areas in which the one or more UEs have been located;
maintain a mapping between the one or more tracking areas and one or more respective geographical locations;
receive, by a Unified Data Management function ("UDM") of the wireless network, a request for information associated with a particular UE, wherein the request includes attributes of the particular UE;
compare the attributes of the particular UE to the attributes of the one or more UEs associated with the one or more models;
identify, by the UDM and based on the comparing, a particular set of tracking areas with which to associate the particular UE;
identify a particular set of geographical regions that are associated with the particular set of tracking areas; and
output, in response to the request:
an indication of the particular set of geographical regions, and
an indication that the particular UE is associated with the identified particular set of tracking areas,
wherein when the particular UE moves to a first tracking area, that is not in the identified particular set of tracking areas, the UE performs a registration update procedure with the wireless network based on moving to the first tracking area, and
wherein when the particular UE moves to a second tracking area, that is in the identified particular set of tracking areas, the UE forgoes performing the registration update procedure with the wireless network based on moving to the second tracking area.

2. The one or more devices of claim 1, wherein receiving the information indicating one or more tracking areas of the wireless network in which the one or more UEs have been located further includes receiving attributes of the one or more UEs.

3. The one or more devices of claim 1, wherein the attributes of the one or more UEs include sets of tracking areas that have been indicated to the one or more UEs as part of respective registration procedures between the one or more UEs and the wireless network.

4. The one or more devices of claim 3, wherein modifying the one or more models further includes modifying the one or more models based on whether the one or more UEs have been located within one or more tracking areas, of the sets of tracking areas indicated to the one or more UEs, after the sets of tracking areas have been indicated to the one or more UEs.

5. A non-transitory computer-readable medium, storing a plurality of processor-executable instructions to:
identify one or more models that correlate attributes of one or more User Equipment ("UEs") to respective sets of tracking areas associated with a wireless network;
receive, from an Access and Mobility Management Function ("AMF") of the wireless network, information indicating one or more tracking areas of the wireless network in which the one or more UEs have been located, wherein the AMF determines the one or more tracking areas based on registration procedures between the AMF and the one or more UEs;

modify the one or more models based on the received information indicating the one or more tracking areas in which the one or more UEs have been located;

maintain a mapping between the one or more tracking areas and one or more respective geographical locations;

receive, by a Unified Data Management function ("UDM") of the wireless network, a request for information associated with a particular UE, wherein the request includes attributes of the particular UE;

compare the attributes of the particular UE to the attributes of the one or more UEs associated with the one or more models;

identify, by the UDM and based on the comparing, a particular set of tracking areas with which to associate the particular UE;

identify a particular set of geographical regions that are associated with the particular set of tracking areas; and output, in response to the request:
  an indication of the particular set of geographical regions, and
  an indication that the particular UE is associated with the identified particular set of tracking areas,
    wherein when the particular UE moves to a first tracking area, that is not in the identified particular set of tracking areas, the UE performs a registration update procedure with the wireless network based on moving to the first tracking area, and
    wherein when the particular UE moves to a second tracking area, that is in the identified particular set of tracking areas, the UE forgoes performing the registration update procedure with the wireless network based on moving to the second tracking area.

6. The non-transitory computer-readable medium of claim 5, wherein receiving the information indicating one or more tracking areas of the wireless network in which the one or more UEs have been located further includes receiving attributes of the one or more UEs.

7. The non-transitory computer-readable medium of claim 5, wherein the attributes of the one or more UEs include sets of tracking areas that have been indicated to the one or more UEs as part of respective registration procedures between the one or more UEs and the wireless network.

8. The non-transitory computer-readable medium of claim 7, wherein modifying the one or more models further includes modifying the one or more models based on whether the one or more UEs have been located within one or more tracking areas, of the sets of tracking areas indicated to the one or more UEs, after the sets of tracking areas have been indicated to the one or more UEs.

9. A method, comprising:
  identifying one or more models that correlate attributes of one or more User Equipment ("UEs") to respective sets of tracking areas associated with a wireless network;

receiving, from an Access and Mobility Management Function ("AMF") of the wireless network, information indicating one or more tracking areas of the wireless network in which the one or more UEs have been located, wherein the AMF determines the one or more tracking areas based on registration procedures between the AMF and the one or more UEs;

modifying the one or more models based on the received information indicating the one or more tracking areas in which the one or more UEs have been located;

maintaining a mapping between the one or more tracking areas and one or more respective geographical locations;

receiving, by a Unified Data Management function ("UDM") of the wireless network, a request for information associated with a particular UE, wherein the request includes attributes of the particular UE;

comparing the attributes of the particular UE to the attributes of the one or more UEs associated with the one or more models;

identifying, by the UDM and based on the comparing, a particular set of tracking areas with which to associate the particular UE; and outputting, in response to the request:
  an indication of the particular set of geographical regions, and
  an indication that the particular UE is associated with the identified particular set of tracking areas,
    wherein when the particular UE moves to a first tracking area, that is not in the identified particular set of tracking areas, the UE performs a registration update procedure with the wireless network based on moving to the first tracking area, and
    wherein when the particular UE moves to a second tracking area, that is in the identified particular set of tracking areas, the UE forgoes performing the registration update procedure with the wireless network based on moving to the second tracking area.

10. The method of claim 9, wherein receiving the information indicating one or more tracking areas of the wireless network in which the one or more UEs have been located further includes receiving attributes of the one or more UEs.

11. The method of claim 9, wherein the attributes of the one or more UEs include sets of tracking areas that have been indicated to the one or more UEs as part of respective registration procedures between the one or more UEs and the wireless network.

12. The method of claim 11, wherein modifying the one or more models further includes modifying the one or more models based on whether the one or more UEs have been located within one or more tracking areas, of the sets of tracking areas indicated to the one or more UEs, after the sets of tracking areas have been indicated to the one or more UEs.

* * * * *